F. P. KUHN.
TOOL HOLDER.
APPLICATION FILED OCT. 19, 1909.

966,755.

Patented Aug. 9, 1910.
2 SHEETS—SHEET 1.

Witnesses
W. N. Woodson
Juana M. Fallin

Inventor
Frank P. Kuhn

By
Attorneys

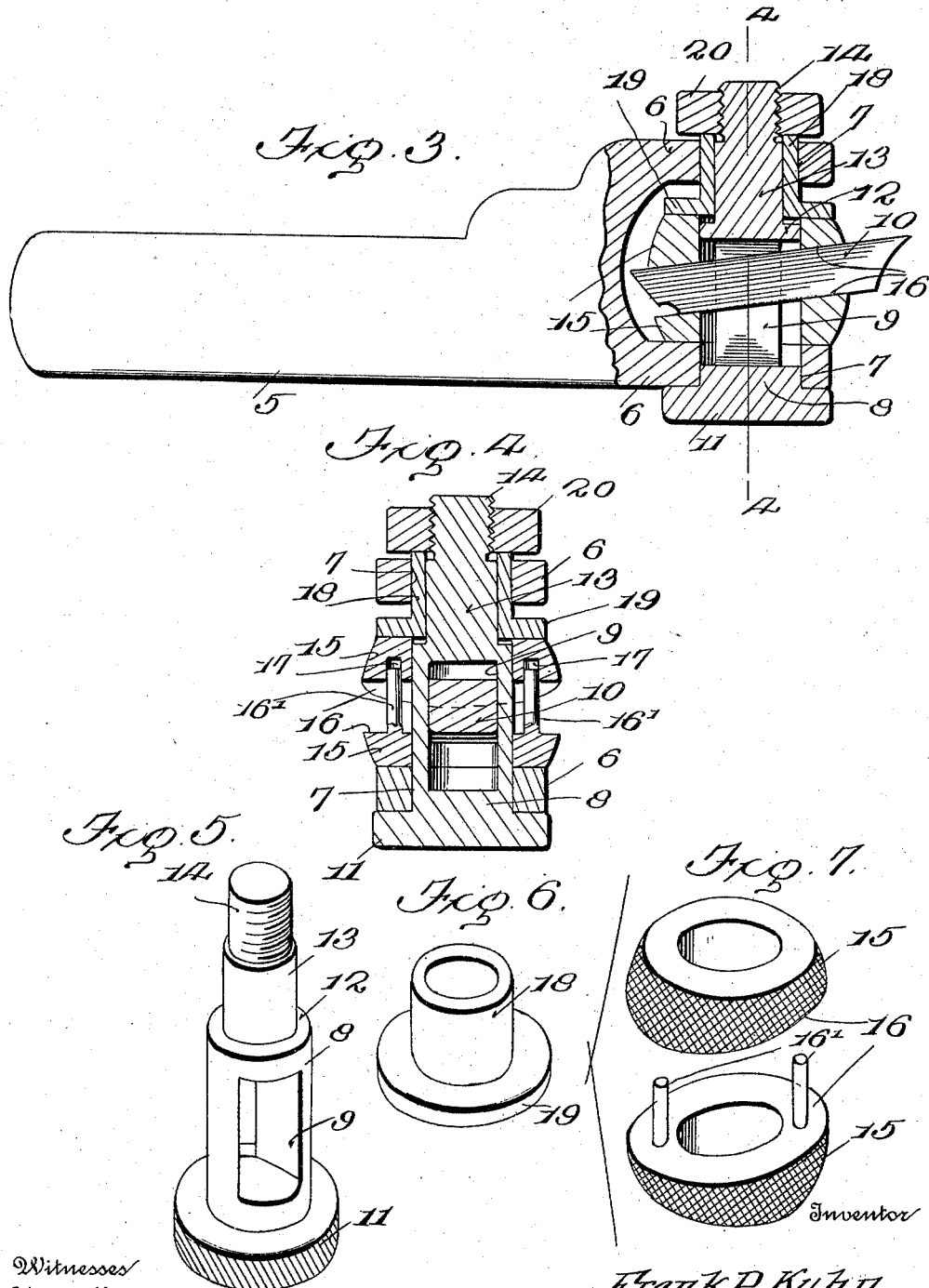

UNITED STATES PATENT OFFICE.

FRANK P. KUHN, OF KEARNEY, NEBRASKA, ASSIGNOR OF ONE-THIRD TO CHARLES M. KUHN AND ONE-THIRD TO JACOB E. HERMAN, BOTH OF KEARNEY, NEBRASKA.

TOOL-HOLDER.

966,755.  Specification of Letters Patent.  Patented Aug. 9, 1910.

Application filed October 19, 1909. Serial No. 523,408.

*To all whom it may concern:*

Be it known that I, FRANK P. KUHN, citizen of the United States, residing at Kearney, in the county of Buffalo and State of Nebraska, have invented certain new and useful Improvements in Tool-Holders, of which the following is a specification.

This invention relates to tool holders for lathes, planers, shapers, and other machinery, and has for its object to provide a strong, durable and thoroughly efficient device of this character, the construction of which is such that the cutting tool may be rigidly supported in the holder, thus to prevent jarring or vibration of said tool and consequently insure a better grade of work than heretofore.

A further object is to provide a holder, the cutting tool of which may be adjusted in a vertical and horizontal plane so as to permit the tool to be used on different kinds of work.

A further object is to insure the positive clamping of the cutting tool between the angle washers by the provision of a collet or flanged sleeve which engages the upper end of the slotted pin or post and forces said washers in contact with the tool when the clamping nut is adjusted.

A still further object of the invention is generally to improve this class of devices so as to increase their utility, durability and efficiency.

Further objects and advantages will appear in the description, it being understood that various changes in form, proportions and minor details of construction may be resorted to within the scope of the appended claims.

For a full understanding of the invention reference is to be had to the following description and accompanying drawings, in which:—

Figure 1:
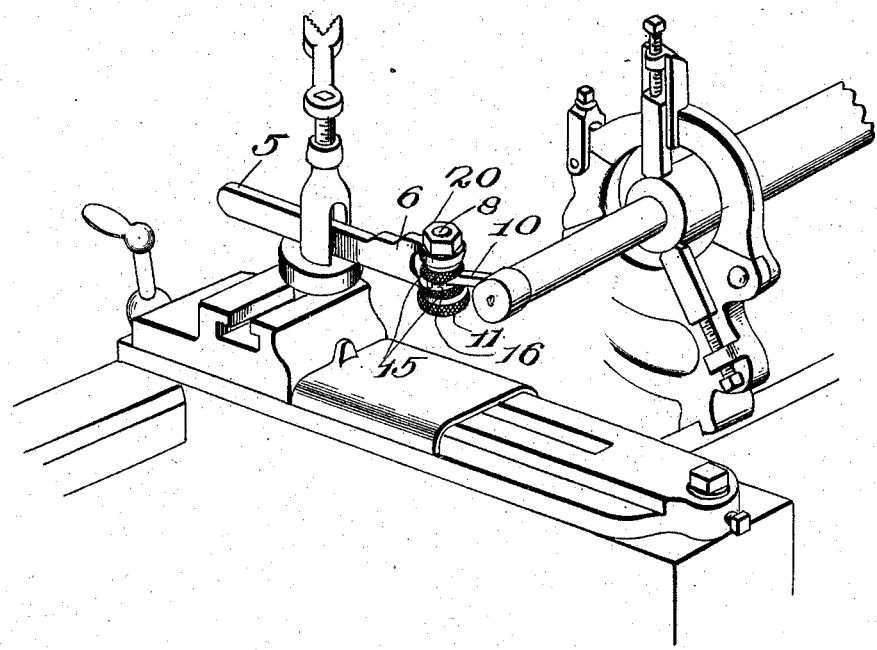
Figure 2:
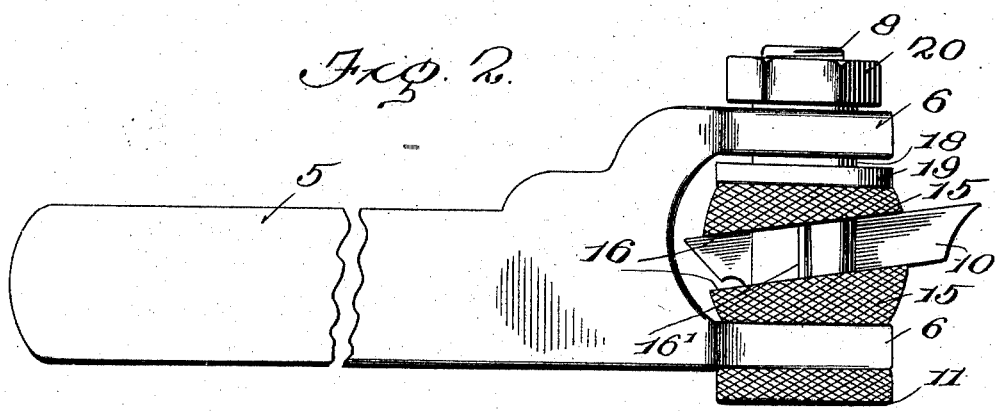

Figure 1 is a perspective view of a tool holder constructed in accordance with my invention showing the same in position on a machine. Fig. 2 is a side elevation of the device detached. Fig. 3 is a vertical sectional view partly in elevation. Fig. 4 is a similar view taken on the line 4—4 of Fig. 3. Fig. 5 is a perspective view of the slotted pin detached. Fig. 6 is a similar view of the collet or sleeve. Fig. 7 is a perspective view of the clamping members or washers detached.

Corresponding and like parts are referred to in the following description and indicated in all the views of the accompanying drawings by the same reference characters.

The improved tool holder forming the subject-matter of the present invention comprises a shank 5, one end of which is adapted to be inserted in the tool post of a cutting lathe, planer, shaper or other machine, the opposite end of the shank being bifurcated to form a pair of spaced jaws 6 having vertically disposed openings 7 formed therein, as shown.

Mounted for rotation in the openings 7 is a pin 8, the intermediate portion of which is slotted at 9 to permit the insertion of a cutting tool indicated at 10. The lower end of the pin 9 is provided with an enlarged head 11 which bears against the adjacent surface of the lower jaw 6, while the upper end thereof is provided with a shoulder 12 defining a reduced cylindrical portion 13, the walls of which are threaded for a portion of its length as indicated at 14.

Surrounding the pin 8 and disposed on opposite sides of the cutting tool 10 are clamping members 15, preferably in the form of washers, and each provided with a cam face 16, so that by rotating said washers or clamping members on the pin 8, the position of the active end of the cutting tool may be varied and said cutting tool supported at any angle or inclination with respect to the work. One of the clamping members or washers 15 is provided with a plurality of pins 16' which enter correspondingly shaped recesses 17 formed in the cam face of the adjacent washer so as to permit said washers to rotate in unison when it is desired to adjust the cutting tool laterally with respect to the shank.

The exterior walls of the cylindrical extension 13 are spaced from the interior walls of the upper opening 7 to permit the insertion of a collet or sleeve 18, the upper end of which projects above the upper surface of the upper jaw 6, while the lower end of the sleeve is provided with a laterally extending flange 19 which bears against the upper face of the adjacent clamping member or washer 15. A clamping nut 20 engages the threads 14 of the cylindrical extension 13 so that by adjusting the nut on the threads 14 the sleeve 18 will be forced downwardly into engagement with the upper clamping member or washer, and thus cause both washers to firmly grip the tool and rigidly support the same in adjusted position so as to prevent jarring or vibration of said tool when the latter is in use. Thus it will be seen that by loosening the clamping nut 20, the cutting tool, together with the washers or clamping members 15 may be rotated in a horizontal plane to adjust the cutting tool laterally with respect to the shank 5, while by disengaging the pins 16' from the sockets 17 and rotating the washers on the pin 8, the vertical adjustment of the tool may be effected, said tool being rigidly supported in an adjusted position by tightening the clamping nut 20.

It will of course be understood that any style of cutting tool may be used in connection with the holder, and that a locking nut may be superposed on the nut 20 for the purpose of assisting in retaining the parts in assembled position if found desirable or necessary.

It will be noted that by rotating the angle washers with the cutting tool between them the tool may be pitched sidewise so as to give a clearance to the bottom of the cutter when cutting threads, and also to allow the cutter to follow the course of the threads.

It will also be noted that the washers and cutting tool may be turned either to the right or left thus to give a clearance to either right or left hand threads.

Having thus described the invention what is claimed as new is:—

1. A tool holder including a shank, having one end thereof provided with spaced jaws, a slotted pin carried by the jaws, a cutting tool seated in the slot in said pin, clamping members surrounding the pin and engaging the tool, a sleeve carried on one end of the pin, and projecting above the adjacent jaw, and a clamping nut threaded on the pin and adapted to engage the projecting upper end of the sleeve for forcing the lower end thereof into engagement with the adjacent clamping member.

2. A tool holder including a shank, having one end thereof provided with spaced jaws, having registering openings formed therein, a slotted pin seated in said openings and having a smooth bearing surface, a cutting tool extending through the slot in the pin and adjustable vertically and horizontally with respect to the shank, clamping members carried by the pin and disposed on opposite sides of the tool, a sleeve encircling the pin at said bearing surface and having its upper end projecting above the adjacent jaw and a clamping nut carried by the pin and adapted to bear against the projecting end of the sleeve for forcing the clamping members into engagement with the tool.

3. A tool holder including a shank, having one end thereof bifurcated to form spaced jaws having registering openings formed therein, a slotted pin seated in said openings and having a smooth cylindrical surface, a cutting tool inserted in the slot in the pin, clamping members having cam faces adapted to bear against the tool, a sleeve surrounding the bearing surface of the pin and having its upper end projecting above the adjacent jaw, and its lower end provided with a flange adapted to bear against the adjacent clamping member, and means carried by the pin and engaging the projecting upper end of the sleeve for pressing the flange into engagement with the adjacent clamping member.

4. A tool holder including a shank, having one end thereof bifurcated to form spaced jaws provided with registering openings, a slotted pin seated in said openings and having its upper portion provided with a shoulder defining a cylindrical extension having a smooth cylindrical bearing surface, the upper portion of said extension being threaded, a tool seated in the slotted pin, clamping members disposed on opposite sides of the tool and provided with opposing cam faces for engagement with the adjacent sides of said tool, a sleeve interposed between the bearing surface of the cylindrical extension of the pin and the wall of the opening in the adjacent jaw and having its upper end projecting above said jaw, and its lower end provided with a laterally extending flange adapted to bear against one of the clamping members, and a nut engaging the threads on the cylindrical portion of the pin and bearing against the adjacent end of the sleeve for actuating the clamping members.

5. A tool holder including a shank having one end thereof provided with spaced jaws having registering openings, a slotted pin seated in said openings having its upper end provided with a smooth bearing surface and terminal threads, a cutting tool extended through the slot in the pin, clamping members encircling the pin and provided with opposing cam faces for engagement with the cutting tool, pins extending vertically from the cam face of one of the clamping members and entering sockets formed in the cam face of the mating clamping member, a nut engaging the threads on the pin, and a sleeve interposed between the nut and the adjacent clamping member and encircling the bearing surface of the pin, the upper end of said sleeve being extended above the adjacent jaw, and the lower end thereof provided with a lateral extending flange adapted to contact with said clamping member for forcing both clamping members into engagement with the tool when the nut is rotated.

6. A tool holder including a shank having, one end thereof provided with spaced jaws having registering openings formed therein, a sleeve seated in the opening of one of the jaws and having smooth interior and exterior walls, the upper end of the sleeve being extended above the adjacent jaw and the lower end thereof provided with a laterally extending flange, a pin having one end thereof journaled in the opening in the lower jaw and its other end reduced and journaled in the sleeve, said pin being provided with a transverse slot for the reception of a cutting tool, clamping members surrounding the pin at the slotted portion thereof and adapted to engage said tool, and a nut threaded on the reduced portion of the pin and adapted to bear against the adjacent end of the sleeve for pressing the flange of said sleeve against the adjacent clamping member.

In testimony whereof I affix my signature in presence of two witnesses.

FRANK P. KUHN. [L. S.]

Witnesses:
F. V. WILLIAMS,
C. L. SWARTSLEY.